(12) United States Patent
Krahl et al.

(10) Patent No.: US 7,565,781 B2
(45) Date of Patent: Jul. 28, 2009

(54) CONVEYOR FOR FEEDING SMALL OBJECTS TO A BLISTER-FILM LOADER

(75) Inventors: Wolfgang Krahl, Laupheim (DE); Wolfgang Rodi, Laupheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 113 days.

(21) Appl. No.: 11/803,070

(22) Filed: May 11, 2007

(65) Prior Publication Data

US 2007/0261368 A1 Nov. 15, 2007

(30) Foreign Application Priority Data

May 11, 2006 (DE) ........................ 10 2006 022 262

(51) Int. Cl.
*B65B 35/38* (2006.01)
(52) U.S. Cl. .............................. 53/158; 53/534; 53/539; 53/246; 53/247; 53/251; 198/468.6
(58) Field of Classification Search .................. 53/147, 53/158, 531, 534, 539, 235, 246, 247, 249–252; 198/408, 409, 468.6, 468.1, 468.11, 607, 198/795, 465.1, 465.2
See application file for complete search history.

(56) References Cited

U.S. PATENT DOCUMENTS

| | | | | |
|---|---|---|---|---|
| 1,476,274 A | * | 12/1923 | Weber et al. ................... | 53/246 |
| 3,021,655 A | * | 2/1962 | Chadima et al. ............... | 53/246 |
| 3,633,739 A | * | 1/1972 | Renner et al. .................. | 53/534 |
| RE27,405 E | * | 6/1972 | Ehe et al. ....................... | 53/246 |
| 4,246,740 A | * | 1/1981 | Chenevard .................... | 53/247 |
| 4,693,057 A | * | 9/1987 | Rittinger et al. ............... | 53/539 |
| 4,699,559 A | | 10/1987 | Bibbo | |
| 4,907,398 A | * | 3/1990 | Holze et al. ................... | 53/247 |
| 6,398,538 B1 | * | 6/2002 | Padovani ................. | 198/468.6 |
| 7,313,898 B1 | * | 1/2008 | Eller et al. .................... | 53/251 |
| 7,328,557 B2 | * | 2/2008 | Gertitschke et al. ........... | 53/439 |

FOREIGN PATENT DOCUMENTS

| DE | 197 43 532 | 4/1998 |
|---|---|---|
| DE | 199 26 893 | 12/2000 |
| DE | 10 2004 006 375 | 9/2005 |
| DE | 10 2005 049 882 | 2/2007 |

\* cited by examiner

*Primary Examiner*—Stephen F Gerrity
(74) *Attorney, Agent, or Firm*—Andrew Wilford

(57) ABSTRACT

An apparatus for packaging small identical objects in respective blisters of a package strip has at least two separate but substantially identical plates each formed with an array of pockets. An upper conveyor shifts the plates one behind the other horizontally at an upper level from an upstream loading station where objects are fed to the pockets to a downstream transfer station where the objects are transferred to a package strip. A lower conveyor has a single drive motor for dropping the plates at the transfer station from the upper level to a lower return level, then shifting the lowered plates upstream at the lower level against the travel direction to the loading station, and then shifting the plates back up to the upper level.

14 Claims, 3 Drawing Sheets

CONVEYOR FOR FEEDING SMALL OBJECTS TO A BLISTER-FILM LOADER

FIELD OF THE INVENTION

The present invention relates to an apparatus for arraying and feeding small objects to a loader for blisters of a package strip. More particularly this invention concerns such a system used for preparing blister packs of pills or the like.

BACKGROUND OF THE INVENTION

Small objects such as pills, capsules, and tablets are typically produced in bulk but packaged by placing them each in a respective pocket or blister of a plastic packaging strip. Thus the process entails the steps of separating the pills from each other, positioning them in an orderly array, and then transferring them from this array to the respective pockets of the packaging strip. Another plastic film or metallic foil is then bonded on top of the thus filled packaging strip, and the laminate thus formed is cut into individual packages each normally having a plurality of blisters, although it is possible for a package to have only one blister.

The sorting and arraying step is relatively easy. The objects are deposited on a slightly inclined and relatively broad feed plate that is vibrated such that the objects orient themselves in a single layer. The lower outlet end of the vibrating feed plate deposits them gently on a slowly moving conveyor formed with an array of upwardly open pockets typically arrayed identically to the blister pockets of the packaging strip to be loaded. The pockets of this conveyor are dimensioned such that they can each just hold a single one of the objects, and the conveyor is vibrated also so that the objects work their way into the pockets, filling them all. A scraper oriented somewhat downstream along the path of the conveyor pushes the excess objects off the upper surface of the conveyor and recirculates them back to the upstream end of the process, so that downstream of the scraper the conveyor is transporting an exactly ordered array of the objects, one in each pocket.

At a loading station at the downstream end of the conveyor a transfer device comprising a multiplicity of suction grabs oriented identically to the conveyor pockets drops down on the conveyor, which can move slowly continuously or in steps, and picks out all the objects from a short length of the conveyor, then swings normally further downstream and deposits the picked-up objects into the pockets of the packaging foil, which typically is moving in steps transversely past the downstream end of the conveyor. Once a section of the conveyor has been emptied, it is recirculated back to the upstream conveyor end at the downstream end of the vibrating feed plate and gets reloaded as described in German patent 10 2005 049 882 issued 1 Feb. 2007.

The problem with this system is that the recirculation of the feed plated is fairly complicated. At the loading station the plates are dropped down by a special device having its own actuator and engaging it on the downstream and of a conveyor belt that then shifts the dropped plate back upstream where it is transferred to another special device that raises it up to the feed level, where it forms the downstream end of a succession of such plates that are pushed downstream, normally in steps. This mechanism is fairly complicated and raises the cost of the machine and increases service problems. The three separate drives necessary for moving the feed plates back upstream must be perfectly synchronized, and any minor failure brings the entire equipment down.

OBJECTS OF THE INVENTION

It is therefore an object of the present invention to provide an improved conveyor for feeding small objects to a blister-film loader.

Another object is the provision of such an improved conveyor for feeding small objects to a blister-film loader that overcomes the above-given disadvantages, in particular that is of simpler construction than the prior art, especially with regard to the feed-plate recirculator.

SUMMARY OF THE INVENTION

An apparatus for packaging small identical objects in respective blisters of a package strip has according to the invention at least two separate but substantially identical plates each formed with an array of pockets dimensioned to hold a respective one of the objects. An upper conveyor shifts the plates one behind the other horizontally at an upper level from an upstream loading station to a downstream transfer station. The objects are fed to the plates at the upstream station and ordered such that at the transfer station there is one of the objects in each of the pockets and otherwise the plates are free of the objects. A transfer device at the transfer station has a plurality of grabs shiftable from above the upper level to a position above the pockets of the package strip so that the transfer device can pick the objects out of the plate in the transfer station and put them in the blisters of the package strip. A lower conveyor has a single drive motor for dropping the plates at the transfer station from the upper level to a lower return level, then shifting the lowered plates upstream at the lower level against the travel direction to the loading station, and then shifting the plates back up to the upper level.

Thus with the system of this invention there is only one drive responsible for all movements of the feed plates back upstream, that is opposite the direction they move in when full, from the transfer station to the upper feed level into the loading station. The invention is based on the discovery that it is not necessary to treat the feed plates gently and move then slowly in the return path. Since the plates are empty and are normally very robust elements, they can be moved at fairly high speed so a simple cam-operated lifter, for instance, working on a reciprocating upper stretch of a conveyor belt or chains can easily keep up with the more stately advance of the feed plates downstream in the upper feed level.

Such an apparatus is advantageous as a significant constructive simplification is achieved due to the fact that less space is required and that no different drives to be synchronized are provided. At the same time, the reliability during operation is increased while the performance of the apparatus is maintained.

More particularly according to the invention the lower conveyor includes a slide displaceable below the lower level between the transfer station and the loading station, a support fittable with the feed plates, a parallelogrammatic linkage between the support and the slide and maintaining the support horizontal, a cam extending between the transfer station and the loading station, and a cam follower engaging the cam and raising and lowering the support in accordance with a shape of the cam. The cam is shaped such that movement of the slide back upstream from the transfer station drops the support from the upper level to the lower level and movement of the slide upstream into the loading station raises the support from the lower level to the upper level.

The advantage of this is that everything necessary for the return movement of the feed plates can be effected by a linear movement of the slide. Contrary to the state of the art, this allows for a movement of the feed plate against the feed direction at a considerably increased speed, gaining time for the further treatment of the feed plates returned into the loading station. It has further proven to be advantageous when the drive for moving the feed plates from the transfer station to the upper feed level into the loading station is realized such that it is operated by fluid pressure, particularly in the form of a pneumatic drive or a servo drive.

Furthermore, it is advantageous within the framework of the invention when the conveyor for moving the feed plates on the upper feed level is provided with clamping bars. Thus, the feeding of a plurality of feed plates is realized in a simple manner. Furthermore it is advantageous within the framework of the invention that the conveyor is provided with a linear guide system. In this context, the conveyor can be realized as a device operated by pressure medium, particularly as a pneumatic drive or as a servo motor.

Furthermore, it is advantageous within the framework of the invention when at least one auxiliary filling device is arranged above the feed plates on the upper feed level between the loading station and the transfer station, distributing the small objects into the pockets of the feed plates, thus taking care that the small objects are fed laterally to the pockets on the surface of the feed plate and can reach all of the pockets.

In this context it is particularly advantageous when the auxiliary filling device is constituted as a brush that is centered on a horizontal rotation axis above the feed level and whose bristles lightly engage the upper faces of the feed plates passing underneath. The rotation axis can be perpendicular to the feed direction, or at an acute to it so any objects sitting on the upper faces of the feed plates are moved to the side and have the opportunity, when being brushed diagonally across the plates, to drop into any empty holes. Thus, the brush may also be used as a stirrer and distribute the small objects, depending on the orientation of the rotation axis, diagonally to the feed direction or against the feed direction.

Alternatively, it is also possible that the auxiliary filling device is formed by a bar arranged diagonally to the conveyor, stopping further downstream advance of the small objects on the upper faces of the feed plates and thus preventing such small objects from remaining on the feed plate outside of the pockets, which would lead to a disturbance of the function of the transfer plate. In this connection, it is also convenient when a vibratory drive is connected to the feed plates and also works as an auxiliary filling device. It can be active in any position once the feeding of the small objects to the feed plates is completed.

It has proven to be particularly advantageous within the framework of the invention when the feed plates on the upper feed level are level with the package strip due so that the transfer plate can cover a symmetric and minimal distance when transferring the small objects from the pockets of the furthest downstream feed plate into the blisters of the package strip.

In order to insure a reliable functioning of the apparatus, wherein the small objects are removed from the pockets of the feed plates against the action of gravity, it is recommended to provide the transfer plate as an array of suction grippers or grabs.

For avoiding disturbances in production it is further advantageous to provide a second suction plate for cleaning the feed plate after it has been emptied. This way, fragments and bits of the small objects can be safely removed from the pockets by the second suction plate and thus the feed plates are completely cleaned of small objects by the time they are back at the loading station.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
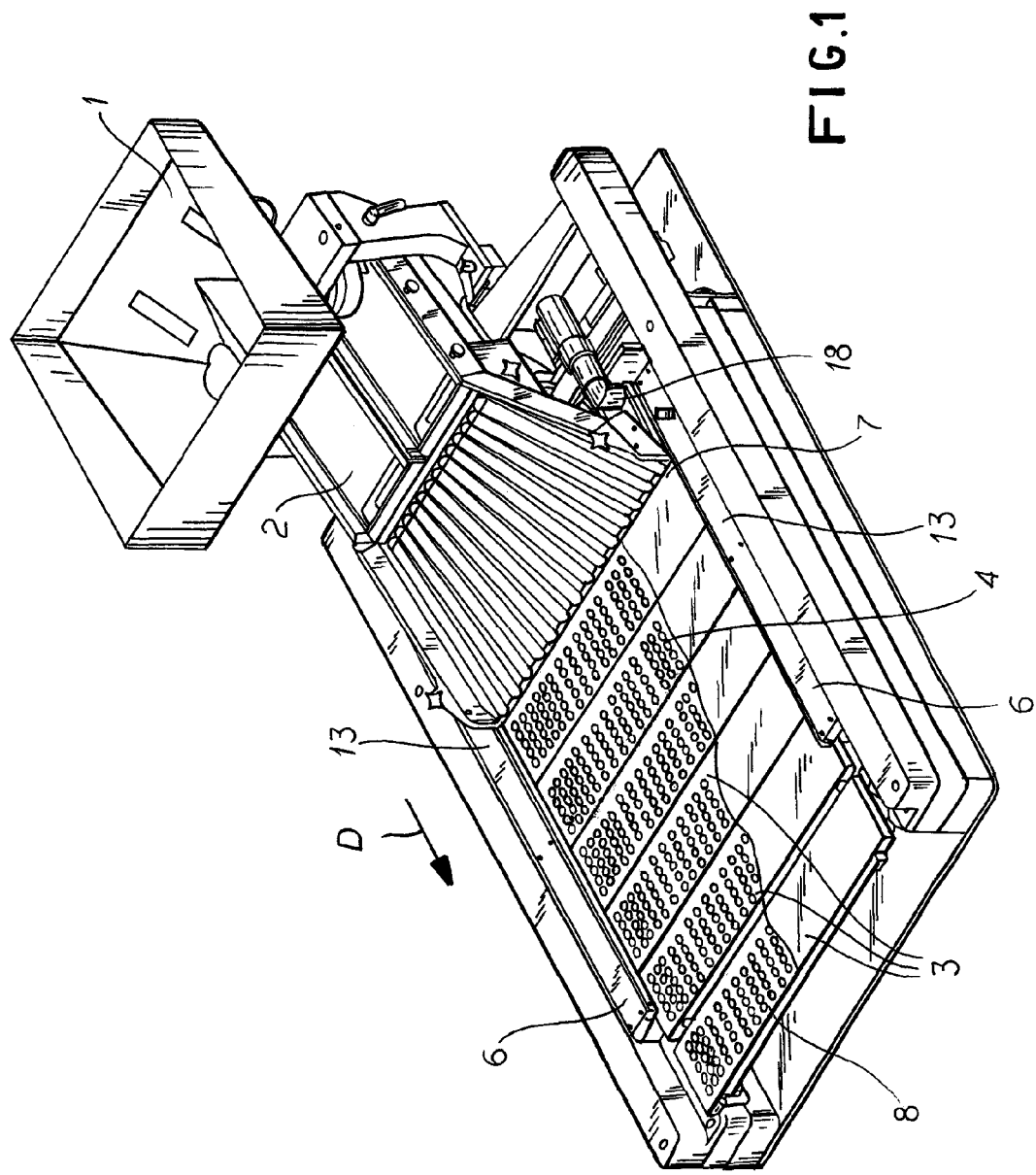
FIG. 1 is a perspective view of the apparatus of this invention.
Figure 3:
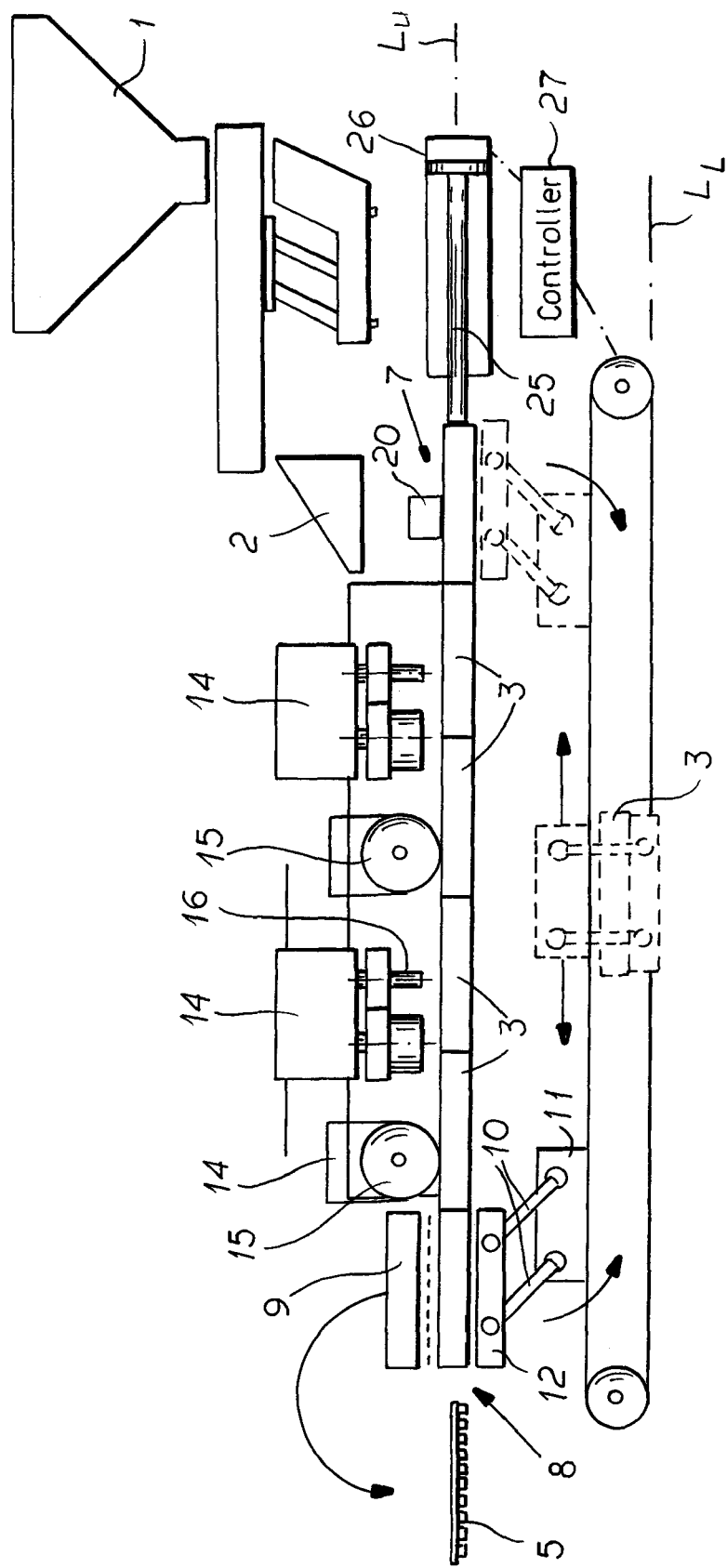
FIG. 3 is a largely schematic side view of the apparatus.

As seen in FIGS. 1 and 3, an apparatus for controlled feeding and positioning of small objects to be packed, not shown here for reasons of clarity but which may be pills, dragees, capsules or the like. The small objects are supplied from a storage vessel 1 via a dosing trough 2 to feed plates 3. Each feed plate 3 is provided with an array of pockets 4 distributed in the same pattern as the blisters of a package strip 5 into which the small objects are to be transferred.

The feed plate 3 can be moved downstream in a travel direction D at an upper feed level $L_U$ by means of a conveyor 6 from a loading station 7 into a transfer station 8. In the transfer station 8 each feed plate 3 is unloaded by a transfer plate 9 having an array of suction grabs that pick the small objects from the pockets 4 of the furthest downstream feed plate 3 and transfer them into the blisters of the package strip 5 that is normally stepped transversely past the downstream end of the apparatus. After the small objects have been taken by the transfer plate 9 from the furthest downstream feed plate 3, it is engaged in the transfer station 8 by a plate support 12 carried on a parallelogrammatic linkage 10 carried by a slide 11 and causing the feed plate 3 to be lowered to a lower return level $L_L$ below the upper feed level $L_U$, as well as a displacement of the feed plate 3 into the loading station 7 and a lifting of the plate 3 to the upper feed level $L_U$ by movement of the slide 11 against the feed direction D and under guidance of a lever 21 coupled to the parallelogrammatic linkage 10 and engaging a cam 22 fixed on the machine frame. Thus the feed plates 3 run endlessly in a continuous circuit.

Movement of the feed plates 3 can be step-wise or be continuous, and a combination of both operation modes, that is stepped in one direction and continuous in the other direction, is also possible. Here the plates 3 move downstream at upper level $L_U$ in steps but move along their U-shaped path back upstream in one basically continuous movement. In the embodiment illustrated in the drawing, there are two parallelogrammatic linkages 10 flanking the support plate 12 and fixed on a common shaft 17 that can be turned by the lever 21. Movement of the feed plates 3 from the transfer station 8 to the upper feed level into the loading station 7 is effected by a single servo motor 23, here a pneumatic one, operated by a controller 27.

Figure 2:
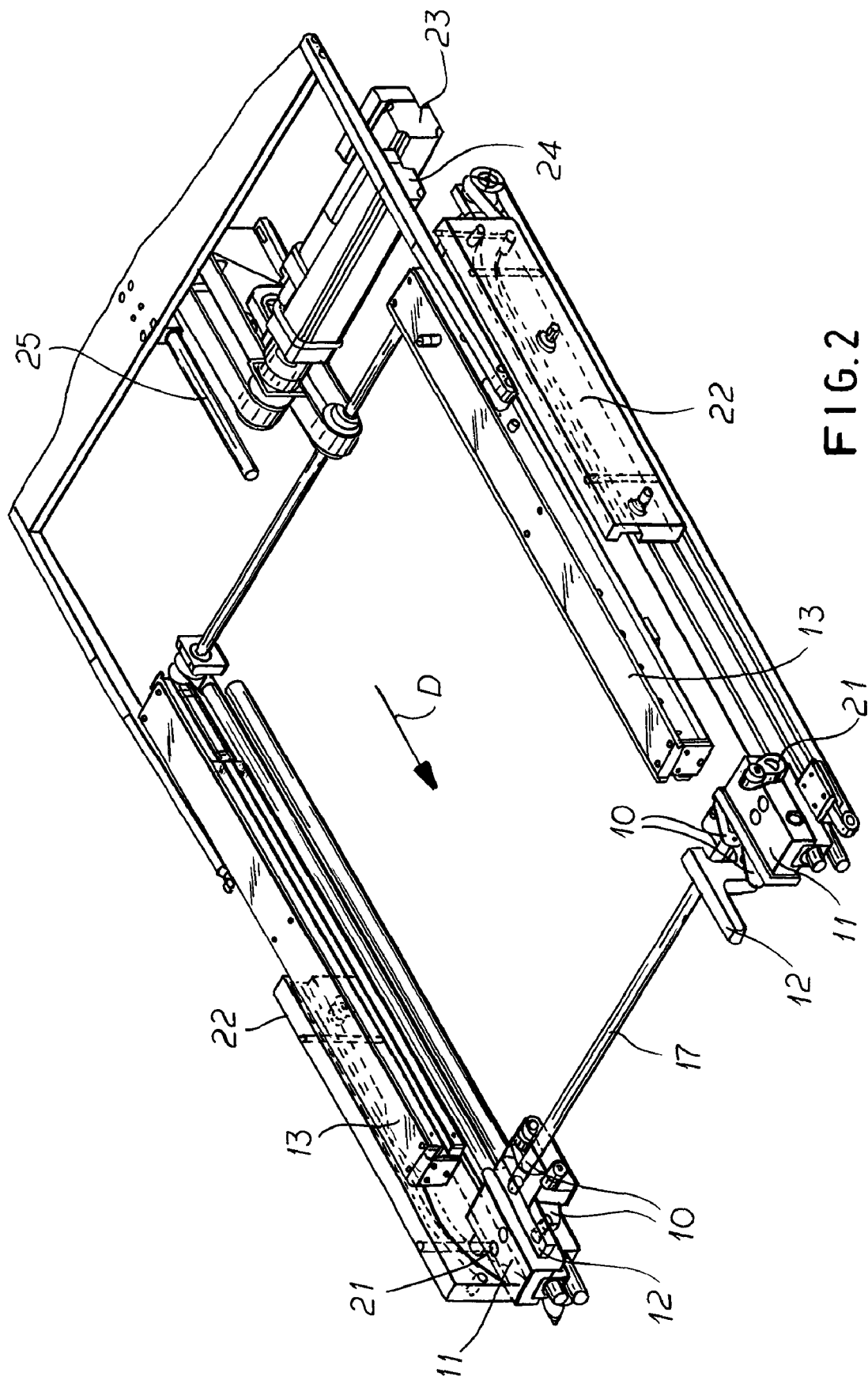
FIG. 2 is a perspective view of the conveyor of the apparatus with some parts removed for clarity of view.

As can be seen in particular in FIG. 2, the conveyor 6 is provided with a pair of U-section guide rails 13 open toward each other and dimensioned so that the ends of the plates 3 can slide smoothly in them. These rails 13 can also grip the plates 3 between steps to hold them perfectly still during product transfer. Here the plates 3 are moved downstream by the simple expedient of pushing on the upstream edge of the furthest upstream plate 3 with the piston rod 25 of a simple pneumatic cylinder 26. Alternately a pneumatic servomotor 23 as shown in FIG. 2 could be used. No fancy controlling is needed, only a slow movement, since the plates 3 are rigid and the furthest downstream plate will engage an abutment when it comes into the transfer station 8, stopping further downstream travel of the entire row of plates 3.

The conveyor 6 is moved by a single servo drive 24 also operated by the controller. However, the conveyor 6 can also be driven by a drive operated by pressure medium, particularly a pneumatic drive.

FIG. 3 shows that auxiliary filling devices 14 are arranged above the plurality of feed plates 3 situated on the upper feed level $L_U$ between the loading station 7 and the transfer station 8, that is two brushes 15 that rotated and having a rotation axes oriented perpendicular to the feed direction D and parallel to the plane formed by the feed plates 3. Furthermore, an auxiliary filling device 14 designed as a stirrer 16 is also provided, having a stirrer rotation axis perpendicular orientation to the feed direction D and to the orientation of the rotation axis of the brushes, so that the stirrer provides for a lateral distribution of the small objects lying on the feed plates 3. In addition, the auxiliary filling device 14 can be formed as a bar extending diagonally to the feed direction D, holding back small objects that have not been fitted into pockets 4 and that are lying on the upper faces of the feed plates 3, thus avoiding malfunction of the transfer plate 9. The sorting of the small objects into the pockets 4 of the feed plates 3 is further assisted by a vibratory drive 20.

Furthermore, it can be seen in FIG. 3 that the feed plates 3 on the upper feed level $L_u$ are level with the package strip 5 so that the transfer plate 9 only has to perform a short movement in order to transfer the small objects from the pockets 4 of the downstream plate 3 into the adjacent blisters of the package strip 5. Furthermore, a second suction plate 18 is provided in the apparatus serving to clean the feed plates 3 after they are emptied of the small objects and advantageously operating shortly in front of the loading station 7 thus ensuring that the feed plates 3 are completely cleaned before being reintegrated into the filling process.

By means of the inventive apparatus, any type and format of films can be filled with the most different small objects. To adjust the format, nothing else but the feed plates 3 as well as the transfer plate 9 have to be exchanged.

We claim:

1. An apparatus for packaging small identical objects in respective blisters of a package strip, the apparatus comprising:
    at least two separate but substantially identical plates each formed with an array of pockets dimensioned to hold a respective one of the objects;
    upper conveyor means for shifting the plates one behind the other horizontally at an upper level from an upstream loading station to a downstream transfer station;
    means for feeding the objects to the plates at the upstream station and ordering the objects such that at the transfer station there is one of the objects in each of the pockets and otherwise the plates are free of the objects;
    a transfer device at the transfer station and having a plurality of grabs shiftable from above the upper level to a position above the pockets of the package strip, whereby the transfer device can pick the objects out of the plate in the transfer station and put them in the blisters of the package strip; and
    lower conveyor means having
        a single drive motor for dropping the plates at the transfer station from the upper level to a lower return level, then shifting the lowered plates upstream at the lower level against the travel direction to the loading station, and then shifting the plates back up to the upper level,
        a slide displaceable below the lower level between the transfer station and the loading station,
        a support fittable with the feed plates,
        a parallelogrammatic linkage between the support and the slide and maintaining the support horizontal,
        a cam extending between the transfer station and the loading station, and
        a cam follower engaging the cam and raising and lowering the support in accordance with a shape of the cam, the cam being shaped such that movement of the slide back upstream from the transfer station drops the support from the upper level to the lower level and movement of the slide upstream into the loading station raises the support from the lower level to the upper level.

2. The packaging apparatus defined in claim 1 wherein there are two such parallelogrammatic linkages flanking ths support and engaged between the support and the slide.

3. The packaging apparatus defined in claim 1 wherein the drive motor is pneumatic.

4. The packaging apparatus defined in claim 1 wherein the drive motor is a servomotor.

5. The packaging apparatus defined in claim 1 wherein the upper conveyor means has a single pneumatic drive motor.

6. The packaging apparatus defined in claim 1 wherein the upper conveyor means includes a pair of gripping guide rails in which the plates are slidable.

7. The packaging apparatus defined in claim 1 further comprising
    auxiliary means above the upper level and between the stations for distributing the objects to the pockets of the plates.

8. The packaging apparatus defined in claim 7 wherein the auxiliary means includes a rotatable brush.

9. The packaging apparatus defined in claim 8 wherein the brush is rotatable about an axis transverse to and above the upper level.

10. The packaging apparatus defined in claim 7 wherein the auxiliary means includes a vibratory drive.

11. The packaging apparatus defined in claim 1 wherein the package strip is generally at the upper level.

12. The packaging apparatus defined in claim 1 wherein the transfer device has a plurality of suction grabs.

13. The packaging apparatus defined in claim 1 further comprising another suction device at the loading station for cleaning the pockets of the plates before filling same with the objects.

14. The packaging apparatus defined in claim 1 further comprising a controller for operating both conveyors.

* * * * *